US006654858B1

(12) United States Patent
Asher et al.

(10) Patent No.: US 6,654,858 B1
(45) Date of Patent: Nov. 25, 2003

(54) METHOD FOR REDUCING DIRECTORY WRITES AND LATENCY IN A HIGH PERFORMANCE, DIRECTORY-BASED, COHERENCY PROTOCOL

(75) Inventors: David H. Asher, Sutton, MA (US); Brian Lilly, Marlborough, MA (US); Richard E. Kessler, Shrewsbury, MA (US); Michael Bertone, Marlborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 431 days.

(21) Appl. No.: 09/652,324

(22) Filed: Aug. 31, 2000

(51) Int. Cl.[7] .............................................. G06F 12/00
(52) U.S. Cl. ...................................................... 711/144
(58) Field of Search ........................ 711/118–121, 124, 711/126, 141–146

(56) References Cited

U.S. PATENT DOCUMENTS

| | | | |
|---|---|---|---|
| 5,261,066 A | 11/1993 | Jouppi et al. ................ | 395/425 |
| 5,317,718 A | 5/1994 | Jouppi ......................... | 395/425 |
| 5,758,183 A | 5/1998 | Scales ......................... | 395/825 |
| 5,761,729 A | 6/1998 | Scales ......................... | 711/148 |
| 5,787,480 A | 7/1998 | Scales et al. ................ | 711/148 |
| 5,802,585 A | 9/1998 | Scales et al. ................ | 711/154 |
| 5,809,450 A | 9/1998 | Chrysos et al. ............. | 702/186 |
| 5,875,151 A | 2/1999 | Mick ........................... | 365/233 |
| 5,890,201 A | 3/1999 | McLellan et al. ........... | 711/108 |
| 5,893,931 A | 4/1999 | Peng et al. .................. | 711/206 |
| 5,918,250 A | 6/1999 | Hammond ................... | 711/205 |
| 5,918,251 A | 6/1999 | Yamada et al. .............. | 711/207 |
| 5,923,872 A | 7/1999 | Chrysos et al. ............. | 395/591 |
| 5,943,685 A * | 8/1999 | Arimilli et al. ............. | 711/143 |
| 5,950,228 A | 9/1999 | Scales et al. ................ | 711/148 |
| 5,964,867 A | 10/1999 | Anderson et al. ........... | 712/219 |
| 5,983,325 A | 11/1999 | Lewchuk ..................... | 711/137 |

(List continued on next page.)

OTHER PUBLICATIONS

*Alpha Architecture Reference Manual*, Third Edition, The Alpha Architecture Committee, 1998 Digital Equipment Corporation (21 p.), in particular pp. 3–1 through 3–15.

(List continued on next page.)

*Primary Examiner*—Matthew Kim
*Assistant Examiner*—Woo H. Choi

(57) ABSTRACT

A computer system has a plurality of processors wherein each processor preferably has its own cache memory. Each processor or group of processors may have a memory controller that interfaces to a main memory. Each main memory includes a "directory" that maintains the directory coherence state of each block of that memory. One or more of the processors are members of a "local" group of processors. Processors outside a local group are referred to as "remote" processors with respect to that local group. Whenever a remote processor performs a memory reference for a particular block of memory, the processor that maintains the directory for that block normally updates the directory to reflect that the remote processor now has exclusive ownership of the block. However, memory references between processors within a local group do not result in directory writes. Instead, the cache memory of the local processor that initiated the memory requests places or updates a copy of the requested data in its cache memory and also sets associated tag control bits to reflect the same or similar information as would have been written to the directory. If a subsequent request is received for that same block, the local processor that previously accessed the block examines its cache for the associated tag control bits. Using those bits, that processor will determine that it currently has the block exclusive and provides the requested data to the new processor that is requesting the data.

18 Claims, 3 Drawing Sheets

U.S. PATENT DOCUMENTS

| | | | |
|---|---|---|---|
| 6,000,044 A | | 12/1999 | Chrysos et al. ............... 714/47 |
| 6,070,227 A | | 5/2000 | Rokicki ...................... 711/117 |
| 6,085,300 A | | 7/2000 | Sunaga et al. .............. 711/168 |
| 6,115,804 A | * | 9/2000 | Carpenter et al. ............ 712/28 |
| 6,141,692 A | * | 10/2000 | Loewenstein et al. ...... 709/212 |
| 6,338,121 B1 | * | 1/2002 | Nunez et al. ............... 711/140 |

OTHER PUBLICATIONS

*A Logic Design Structure For LSI Testability*, E. B. Eichelberger et al., 1977 IEEE (pp. 462–468).

*Direct RDRAM™ 256/288–Mbit (512K×16/18×32s)*, Preliminary Information Document DL0060 Version 1.01) (69 p.).

*Testability Features of AMD–K6™ Microprocessor*, R. S. Fetherston et al., Advanced Micro Devices (8 p.).

*Hardware Fault Containment in Scalable Shared–Memory Multiprocessors*, D. Teodosiu et al., Computer Systems Laboratory, Stanford University (12 p.), 1977.

*Cellular Disco: resource management using virtual clusters on shared–memory multiprocessors*, K. Govil et al., 1999 ACM 1–58113–140–2/99/0012 (16 p.).

*Are Your PLDs Metastable?*, Cypress Semiconductor Corporation, Mar. 6, 1997 (19 p.).

*Rambus® RIMM™ Module (with 128/144Mb RDRAMs)*, Preliminary Information, Document DL0084 Version 1.1 (12 p.).

*Direct Rambus™ RIMM ™ Module Specification Version 1.0*, Rambus Inc., SL–0006–100 (32 p.), 2000.

*End–To–End Fault Containment In Scalable Shard–Memory Multiprocessors*, D. Teodosiu, Jul. 2000 (148 p.).

* cited by examiner

METHOD FOR REDUCING DIRECTORY WRITES AND LATENCY IN A HIGH PERFORMANCE, DIRECTORY-BASED, COHERENCY PROTOCOL

CROSS-REFERENCE TO RELATED APPLICATIONS

This application relates to the following commonly assigned applications entitled:

"Apparatus And Method For Interfacing A High Speed Scan-Path With Slow-Speed Test Equipment," Ser. No. 09/653,642, filed Aug. 31, 2000, "Priority Rules For Reducing Network Message Routing Latency," Ser. No. 09/652,322, filed Aug. 31, 2000, "Scalable Directory Based Cache Coherence Protocol, " Ser. No. 09/652,703, Filed Aug. 31, 2000, "Scalable Efficient I/O Port Protocol," Ser. No. 09/652,391, filed Aug. 31, 2000, "Efficient Translation Lookaside Buffer Miss Processing In Computer Systems With A Large Range Of Page Sizes," Ser. No. 09/652,552, filed Aug. 31, 2000, "Fault Containment And Error Recovery Techniques In A Scalable Multiprocessor," Ser. No. 09/651,949, filed Aug. 31, 2000, "Speculative Directory Writes In A Directory Based Cache Coherent Nonuniform Memory Access Protocol," Ser. No. 09/652,834, filed Aug. 31, 2000, "Special Encoding Of Known Bad Data," Ser. No. 09/652,314, filed Aug. 31, 2000, "Broadcast Invalidate Scheme," Ser. No. 09/652,165, filed Aug. 31, 2000, "Mechanism To Track All Open Pages In A DRAM Memory System," Ser. No. 09/652,704, filed Aug. 31, 2000, "Programmable DRAM Address Mapping Mechanism," Ser. No. 09/653,093, filed Aug. 31, 2000, "Computer Architecture And System For Efficient Management Of Bi-Directional Bus," Ser. No. 09/652,323, filed Aug. 31, 2000, "An Efficient Address Interleaving With Simultaneous Multiple Locality Options," Ser. No. 09/652,452, filed Aug. 31, 2000, "A High Performance Way Allocation Strategy For A Multi-Way Associative Cache System," Ser. No. 09/653,092, filed Aug. 31, 2000, "Method And System For Absorbing Defects In High Performance Microprocessor With A Large N-Way Set Associative Cache," Ser. No. 09/651,948, filed Aug. 31, 2000, "Mechanism To Reorder Memory Read And Write Transactions For Reduced Latency And Increased Bandwidth," Ser. No. 09/653,094, filed Aug. 31, 2000, "System For Minimizing Memory Bank Conflicts In A Computer System," Ser. No. 09/652,325, filed Aug. 31, 2000, "Computer Resource Management And Allocation System," Ser. No. 09/651,945, filed Aug. 31, 2000, "Input Data Recovery Scheme," Ser. No. 09/653,643, filed Aug. 31, 2000, "Fast Lane Prefetching," Ser. No. 09/652,451, filed Aug. 31, 2000, "Mechanism For Synchronizing Multiple Skewed Source-Synchronous Data Channels With Automatic Initialization Feature," Ser. No. 09/652,480, filed Aug. 31, 2000, and "Mechanism To Control The Allocation Of An N-Source Shared Buffer," Ser. No. 09/651,924, filed Aug. 31, 2000, and "Chaining Directory Reads And Writes To Reduce DRAM Bandwidth In A Directory Based CC-NUMA Protocol," Ser. No. 09/652,315, filed Aug. 31, 2000, all of which are incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention generally relates to reducing latency and directory writes in a multi-processor system. More particularly, the invention relates to reducing latency in a directory-based, multi-processor system. Still more particularly, the invention relates to eliminating directory write operations whenever possible in a directory-based coherence protocol.

2. Background of the Invention

Computer systems typically include one or more processors, memory, and many other devices. Often, the contents of memory are made available by a memory controller to the various other devices in the system. As such, two or more devices (e.g., two processors in a multi-processor system) may attempt to access the same block of memory at substantially the same time. Although being able to provide access to the same block of data by multiple devices in the system is highly desirable from a performance standpoint, it does necessitate taking steps to maintain the "coherency" of each data block.

In a multi-processor computer system, or any system for that matter in which more than one device may request concurrent access to the same piece of data, it is important to keep track of each block of data to keep the data coherent, meaning that the system accurately tracks the status of each data block and prevents two processors from changing two different copies of the same data. If two processors are given copies of the same data block and are permitted to change their copy, then the system at that point would have two different versions of what was previously the same data. The coherency problem is akin to giving two different people the permission to edit two different copies of the same document. Once their editing is complete, two different versions of the same document are present, whereas only one copy of the document is desired. A coherency protocol is needed to prevent this type of situation from happening.

One approach to the coherency problem in a multi-processor computer system is to provide a "directory" for each data block. The directory thus comprises a plurality of entries, one entry for each data block unit. Each directory entry generally includes information that reflects the current state of the associated data block. Such information may include, for example, the identity of which processors have a shared copy of the block or which processor in the system has the exclusive ownership of the block. Exclusive ownership of a data block permits the exclusive owner to change the data. Any processor having a copy of the block, but not having the block exclusive, can examine the data but cannot change the data. A data block may be shared between two or more processors. As such, the directory entry for that block includes information identifying which processors have a shared copy of the block. In general, a directory-based coherency protocol solves the problems noted above.

It is always desirable to enable computer systems to work faster and more efficiently. Anything that can be done to decrease latency in a computer generally makes the computer operate faster. Directory-based coherency computer systems are no exception; reducing the latency involved in such systems is desirable.

BRIEF SUMMARY OF THE INVENTION

The problems noted above are solved in large part by a computer system that has a plurality of processors. Each processor preferably has its own cache memory. Each processor or group of processors may have a memory controller that interfaces to a main memory, such as DRAM-type memory. The main memories include a "directory" that maintains the directory coherence state of each memory block.

One or more of the processors may be members of a "local" group of processors, such as might be the case if multiple processors are fabricated on the same chip. As such, the system might have multiple local processor groupings. Processors outside a local group are referred to as "remote" processors with respect to that local group.

Whenever a remote processor performs a memory reference (e.g., read or write) for a particular block of memory, the processor that maintains the directory for that block normally updates the directory to reflect that the remote processor now has exclusive ownership of the block. In accordance with the preferred embodiment of the invention, however, memory references between processors within a local group, do not result in a directory write. Instead, the cache memory of the local processor that initiated the memory requests places or updates a copy of the requested data in its cache memory and also sets associated tag control bits to reflect the same or similar information as would have been written to the directory. In this way, it is not necessary to write the directory for the requested block because the requesting processor's cache has the same information.

If a subsequent request is received for that same block, the local processor that previously accessed the block examines its cache for the associated tag control bits. Using those bits, that processor will determine that it currently has the block exclusive and provides the requested data to the new processor that is requesting the data. As such, the processor that maintains the directory for the block can ignore the directory entry.

By eliminating directory writes whenever possible, there is a significant latency improvement because of the relatively high bandwidth, low latency nature of processor cache subsystems and the avoidance of directory writes to memory. These and other benefits will become apparent upon reviewing the following disclosure.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

The preferred embodiment of the invention includes a directory-based, multi-processor computer system that is implemented in such a way that directory write operations (referred to simply as "directory writes") in certain situations are not performed, whereas in conventional systems, such writes would have been performed. By eliminating at least some directory writes, less memory bandwidth is consumed and certain inter-processor messages may be eliminated also. The end result is a system that operates with less latency and therefore increased efficiency. More broadly, the concepts described herein can apply to any directory-based, electronic system, not necessarily just in multi-processor computer systems. For illustration purposes, however, the following description focuses on a multi-processor computer system.

Figure 1:
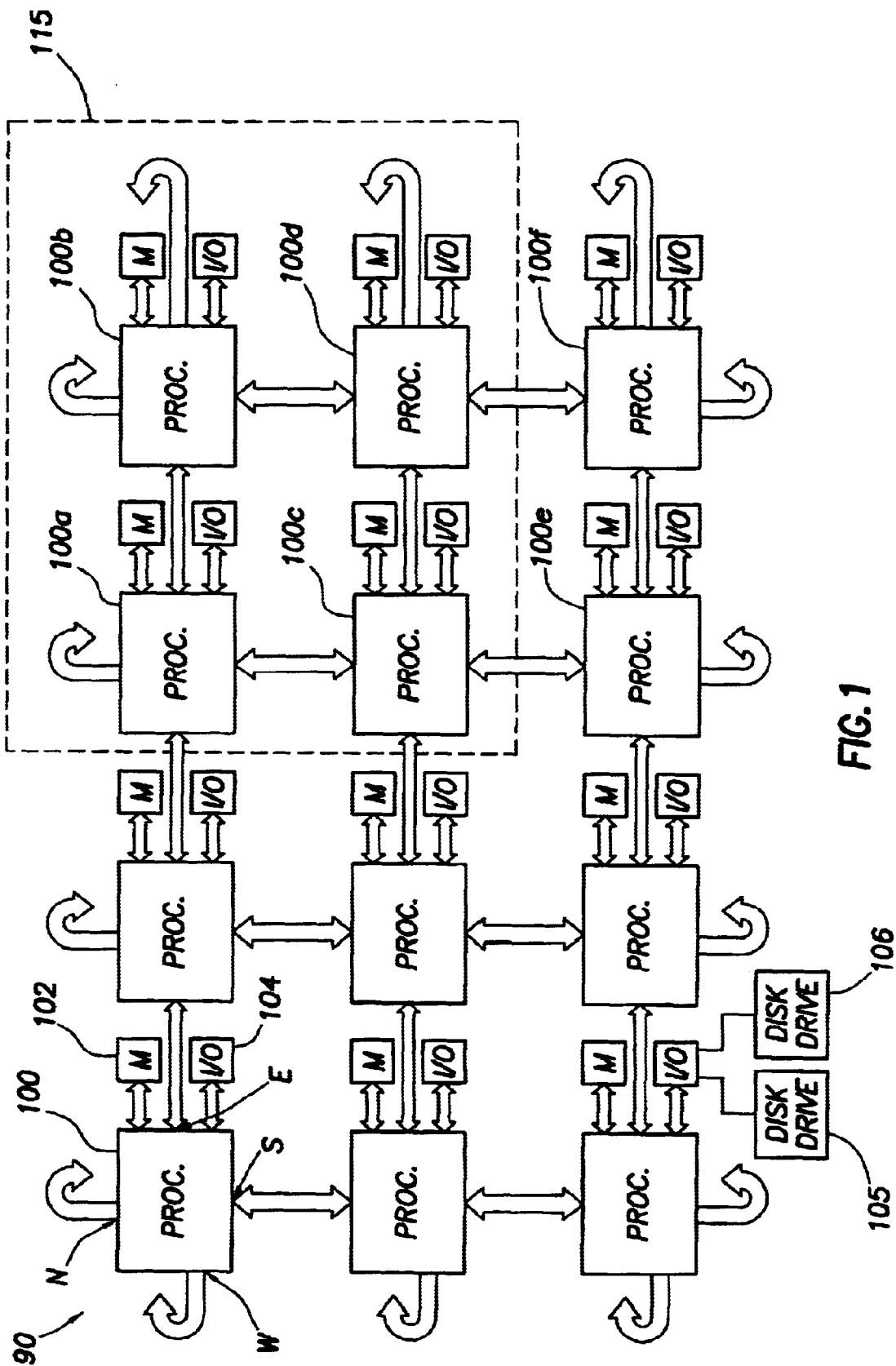
FIG. 1 shows a system diagram of a plurality of microprocessors coupled together in accordance with the preferred embodiment of the invention.

Referring now to FIG. 1, in accordance with the preferred embodiment of the invention, computer system 90 comprises one or more processors 100 coupled to a memory 102 and an input/output ("I/O") controller 104. As shown, computer system 90 includes 12 processors 100, each processor coupled to a memory and an I/O controller. Each processor preferably includes our ports for connection to adjacent processors. The inter-processor ports are designated "North," "South," "East," and "West" in accordance with the well-known Manhattan grid architecture. As such, each processor 100 can be connected to four other processors. The processors on both ends of the system layout wrap around and connect to processors on the opposite side to implement a 2D torus-type connection. Although 12 processors 100 are shown in the exemplary embodiment of FIG. 1, any desired number of processors (e.g., 256) can be included. The configuration of FIG. 1 is merely one possible configuration and one of ordinary skill in the art will recognize many other possible configurations.

The I/O controller 104 provides an interface to various input/output devices such as disk drives 105 and 106 as shown. Data from the I/O devices thus enters the 2D torus via the I/O controllers.

In accordance with the preferred embodiment, the memory 102 preferably comprises RAMbus™ memory devices, but other types of memory devices can be used if desired. The capacity of the memory devices 102 can be any suitable size. Further, memory devices 102 preferably are implemented as Rambus Interface Memory Modules ("RIMMS").

In general, computer system 90 can be configured so that any processor 100 can access its own memory 102 and 110 devices as well as the memory and I/O devices of all other processors in the network. Preferably, the computer system may have physical connections between each processor resulting in low interprocessor communication times and improved memory and I/O device access reliability. If physical connections are not present between each pair of processors, a pass-through or bypass path is preferably implemented in each processor that permits accesses to a processor's memory and I/O devices by another processor through one or more pass-through processors.

If desired, groups of processors 100 can be arranged to form "local" groups, such as local group 115 shown in FIG. 1. Any number of processors 100 can be included in a local group. A single processor itself can be designated as local.

In one embodiment, it may be that the processors in a local group are fabricated on the same semiconductor die. For example, the four processors 100 in local group 115 may all be fabricated on a single chip.

Figure 2:
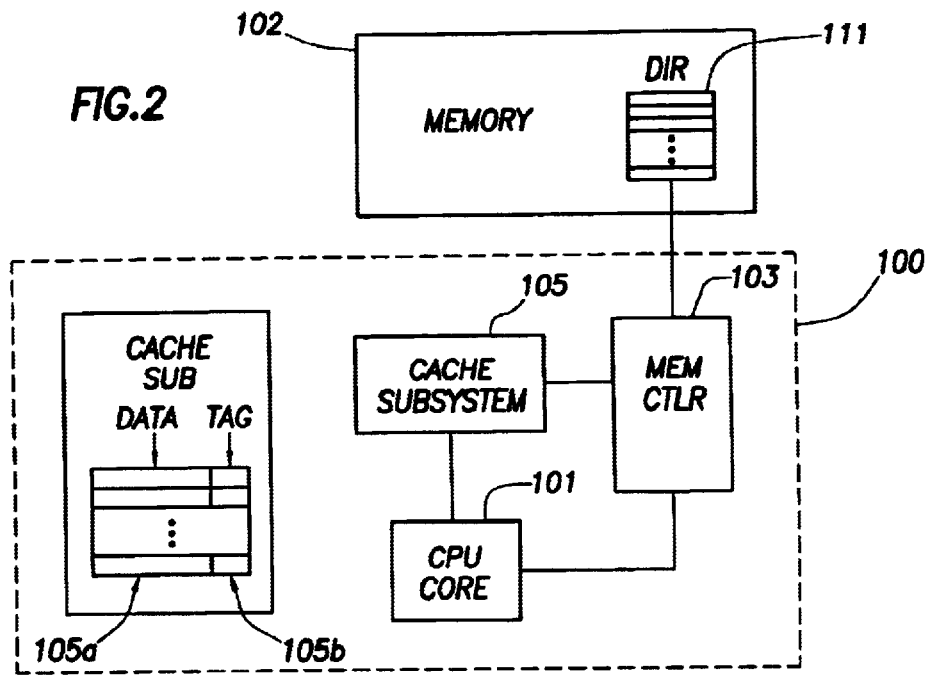
FIG. 2 shows a block diagram of one of the microprocessors of FIG. 1.

Computer system 90 preferably permits sharing of data between the various processors. To maintain the coherence of the system, system 90 preferably implements a directory-based coherence protocol. As such, each processor 100 is responsible for a predetermined range of memory addresses. Referring to FIG. 2, each processor 100 preferably includes a CPU core 101, a memory controller 103, and a cache subsystem 105, as well as many other components. The processor 100 couples to memory 102 which includes a directory table 111. Each entry in the directory table corresponds to a different block of data in memory 102. For example, each directory entry may be associated with a 64-byte data block. The memory controller 103 of each processor 100 is responsible for reading and writing the directories 111. As should be noticed, reading and writing a directory requires communication across a bus that interconnects the memory 102 to the processor 100. Although such transactions are relatively fast as compared to reading and writing a floppy disk drive, the memory transactions for a directory are relatively slow compared to accessing the cache subsystem 105 as is well known in the art. The preferred embodiment of the invention described further below takes advantage of this fact as will become apparent.

Figure 5:
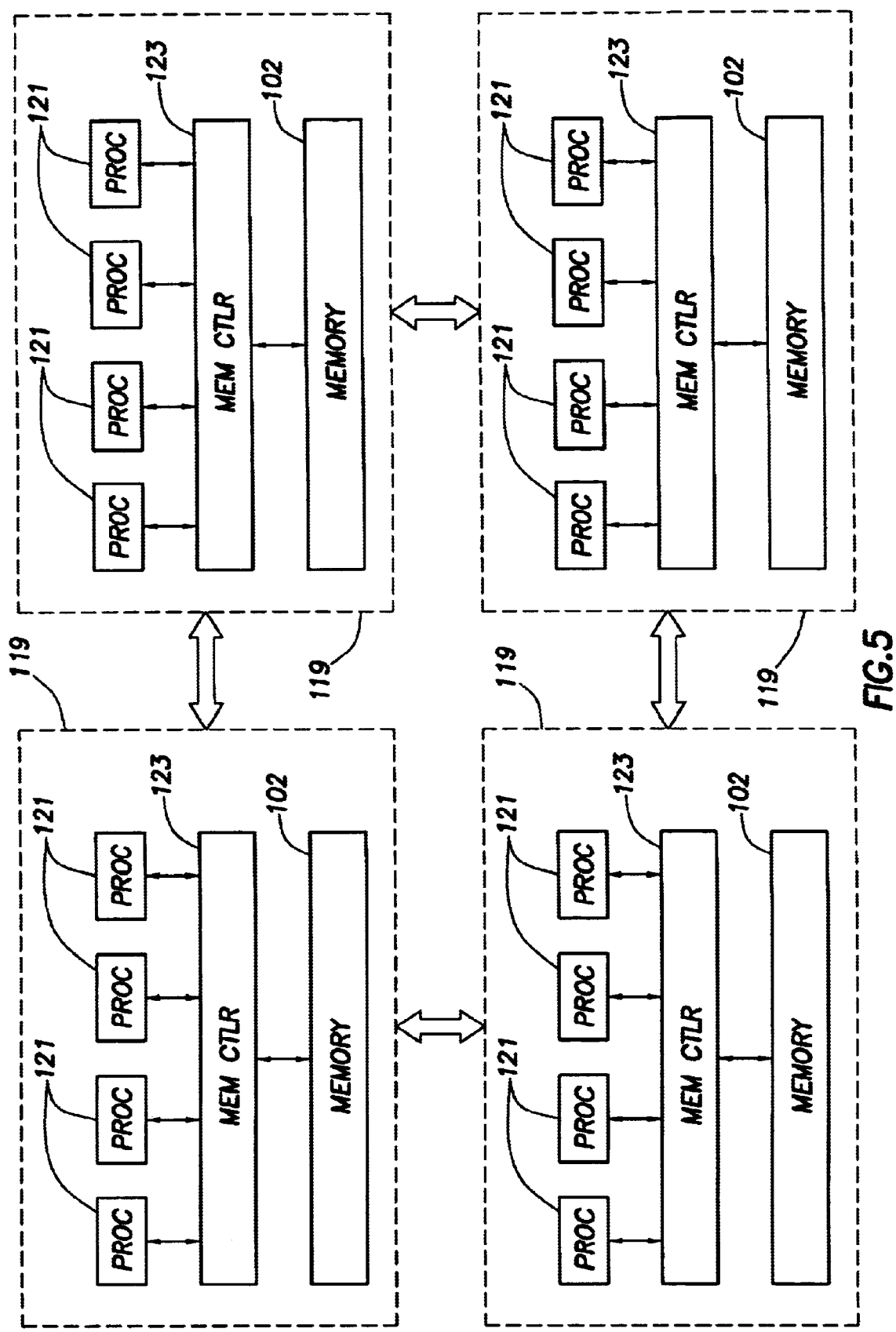
FIG. 5 shows an alternative embodiment of local groups of processors.

An alternative structure to that shown in FIGS. 1 and 2 is shown in FIG. 5 in which each local group 119 of processors 121 couples to a single memory controller 123. As shown, the memory controller 123 for the local processors interfaces the processors to the memory 102. Although not shown, each processor 121 may have its own cache subsystem as explained above.

Each directory entry provides the directory "state" of the associated block. Table 1 below defines the various preferred directory states.

and "sharer" processor (also referred to as "node"). These terms are defined as follows:

Requestor—a node that initiates a read or write transaction to another node in which the requested data resides.

Home—a node that contains the memory and directory for the referenced data block.

Owner—a remote node that contains an exclusive copy of the block in its cache and has the right to modify the data.

Sharer—a remote node that contains a shared copy of the block in its cache. Nodes that share a data block are not permitted to modify the data, otherwise the data will be incoherent.

Each data block has a home node that preferably never changes. The directory for a block is maintained at its home node. Thus, the home node is responsible for updating the directory entry for each of its data blocks to maintain coherency throughout the system. Either by pre-programming the system or during system initialization, each processor in the system is made aware of which processor is the home processor for each block of memory. Thus, for example, if block A is provided in the memory 102 of processor 100*a* shown in FIG. 1, all other processors 100 in the system 90 are made aware of that fact. Armed with this knowledge, each processor in the system can determine to which processor to send a message regarding a particular data block of memory.

A copy of a block can be provided to other nodes that request a copy of the block. If another node requests a block and also desires to modify the block, the requesting node must become the owner of the block thereby being granted the block exclusively. If one or more nodes request a copy of a block, such nodes are called sharers and cannot modify the block.

Figure 3:
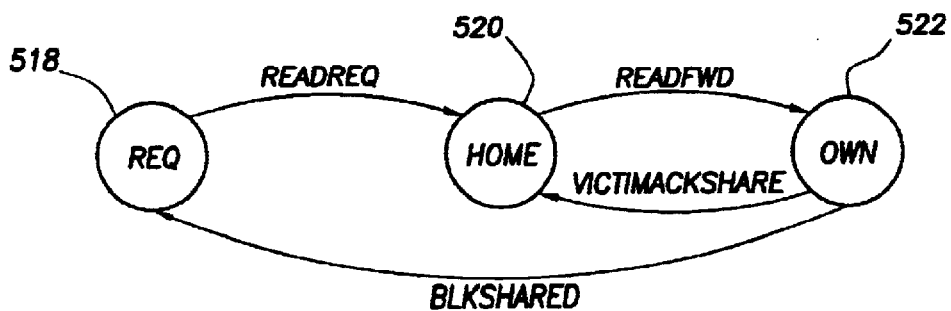
FIG. 3 illustrates the use of a directory-based coherence protocol in one situations.

These principles are, in part, illustrated with reference to FIGS. 3 and 4. FIG. 3 shows a requestor 518, home 520 and

TABLE 1

DIRECTORY STATES

| STATE | DESCRIPTION |
|---|---|
| Local state | Implies that no remote processors have a copy of the block. The block may be held either shared or exclusive locally (or not held at all). |
| Incoherent state | An error state. Error status ("ERRResp") is returned in response to a request to an incoherent block. |
| Exclusive state | Implies that exactly one remote processor holds the current copy of the block. The block may be either in the exclusive-clean or dirty states in the cache at that processor. A request that finds a block in the exclusive state will be forwarded to the exclusive owner. |
| Shared1 | Implies that one remote processor may have shared access to a block (as well as the local processor). |
| Shared2 | Implies that two processors may have shared copies of the block (as well as the local processor). |
| Shared3 | Implies that three processors may have shared copies of the block (as well as the local processor). This state is used only when the system has 64 processors or less. It is enabled by ZBOX0_PID_CTL[PIDWIDTH]. |
| SharedM state | Implies that one or more remote processors may have shared copies of the block, and that the local processor may also have a shared copy of the block. Each M bit indicates whether the corresponding processor(s) may have a copy of the block. An M bit is never set for the local processor. IPR settings define the correspondence between the bits in the mask and the processors in the system. For example, each bit in the mask may refer to a four-processor quad in a 80-processor system. |

The use of these directory states will be illustrated below with reference to the examples of FIGS. 3 and 4. These illustrations use the terms, "home," "owner," "requester," owner 522. In this example, the requester 518 desires a copy of the block, but the home 520 has already given the owner 522 the block exclusive. A read request ("ReadReq") message from the requestor 518 is transferred to the home 520. During system initialization, each node in the system is programmed with which nodes are the home nodes for each block of data in memory. Using this information, the requestor 518 knows to send its read request to home node 520. The home 520 examines its directory entry for the requested data block by reading the particular directory from its memory. The directory for that block will indicate that node 522 currently has the block exclusive. As such, home 522 forwards the request to the owner 522 ("ReadFwd"). The owner 522 responds to the ReadFwd message from home 520 by sending a read reply ("BlkShared") message that includes the requested data block to the requestor 518. At this point, owner 522 and requestor 518 both have a shared copy of the block. Owner 522 sends a VictimAck-Shared message to home 520 indicating that the block is now shared. The home 520 uses this information to update its directory entry for that block to reflect that the block is shared by nodes 522 and 518.

Figure 4:
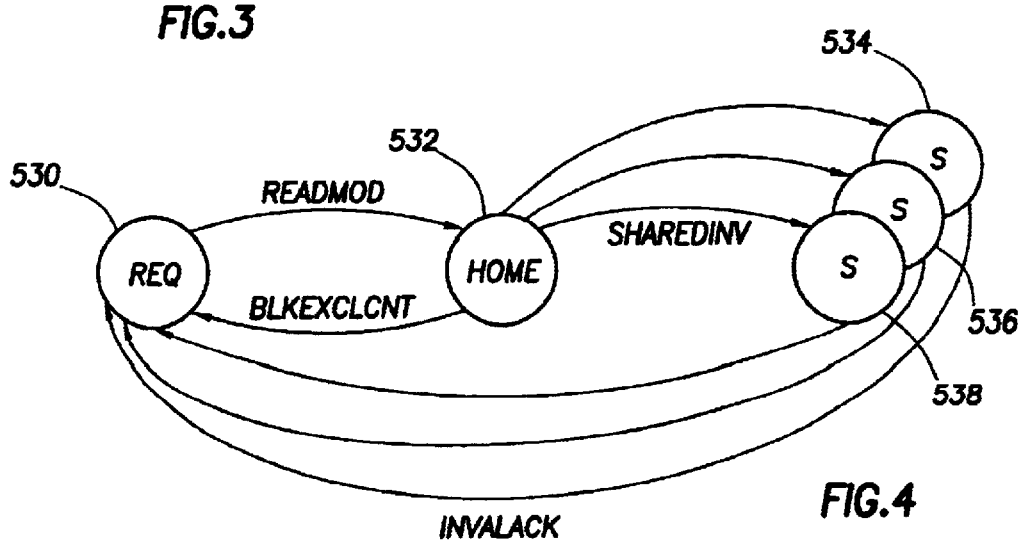
FIG. 4 illustrates the use of a directory-based coherence protocol in another situation.

FIG. 4 shows a requestor 530, a home 532 and three sharers 534, 536, and 538. In this example, the sharers 534, 536, 538 currently have shared copy of a particular data block and the requestor 530 desires to modify that block. The directory entry for the block would thus indicate that the block is in the Shared3 state with nodes 534, 536, 538 being the three sharers. The requestor 530 performs a modify request ("ReadMod") that is sent to the home node 532 containing the memory and directory for the referenced block. Home 532 sends invalidation requests ("SharedInv") to sharers 534, 536 and 538 to direct the three sharers give up their shared copy status. The home 532 also a BlkExclCnt message back to the requestor 530. The BlkExclCnt message contains the number of invalidation acknowledgements to expect from sharer nodes. The requestor 530 modifies the data and stores it in cache in a dirty state. Each sharer 534, 536 and 538 replies to the requestor 530 with invalidation acknowledgments ("InvalAck") that indicate that the sharer has understood that requester 530 may modify the block. The requestor 530 may proceed to modify the block as soon as it receives the BlkExclCnt message from the home, but must stall incoming requests and potential write backs of the data blocks until all InvalAcks are received from sharers 534, 536, and 538.

Each directory entry preferably is a 27-bit entry with each bit defined as shown in Table 2 below. It should be recognized that the particular bit definitions for the directory shown in Table 2 are merely one embodiment of a coherence directory that can be implemented; there are many variations for such directories as would be recognized by one of ordinary skill in the art.

TABLE 2

DIRECTORY STATE ENCODING

| STATE | ENCODING: | COMMENTS |
|---|---|---|
| Bit Num. | 2        11<br>5    0      21          3   0 | |
| Local | CCCCCCXXXXXXXXXXXXXXXXXX0000 | |
| Incoherent | CCCCCCXXXXXXXXXXXXXXXXXX1000 | |
| Exclusive | CCCCCCXXXXXXXXXEEEEEEEEI100 | |
| Shared1 | CCCCCCXXXXXXXXXSSSSSSSS1110 | Shared with list of one share — S |
| Shared2 | CCCCCCXTTTTTTTTSSSSSSSS0110 | Shared with list of two shares — T,S |
| Shared3 | CCCCCCUUUTTTTTTUUSSSSSSU010 | Shared with list of three sharers — U,T,S |
| SharedM | CCCCCCMMMMMMMMMMMMMMMMMMMM1 | Shared with mask |

Each symbol's meaning is given below:
X Don't care.
C Error Correction Code ("ECC") storage.
I Tells whether the exclusive owner is a DMA device (1 = DMA).
E Eight bits for the (encoded) exclusive owner when in exclusive state allowing for 256 processors and an additional 256 DMA/IO devices.
M 20 bits for the sharing mask when in shared state.
S 8/6 bits for the first sharer.
T 8/6 bits for the second sharer.
U 6 bits for the third sharer, S and T are 6 bits.

Each block of data that is the target of a memory access preferably is loaded into the cache subsystem 105 (FIG. 2). It is commonly understood that accessing data from the cache subsystem 105 is faster than accessing the corresponding data from memory 102. Cache subsystems are provided in computer systems under the assumption that once a piece of data is needed, it is likely to be needed again in the near future. Thus, by loading the requested data in the cache subsystem 105, future accesses to that same data (referred to as cache "hits") is performed by accessing the data from the cache instead of from memory 102. If the requested data is not in the cache (referred to as a cache "miss"), then the memory controller 103 must access the requested data from memory 102. Experience has shown that, on balance, overall system performance is enhanced with the inclusion of cache subsystem.

Each block of data stored in cache is commonly called a "cache block," such as cache blocks 105a in FIG. 2. Associated with each cache block is a tag 105b. The tag portion includes information that lets the cache subsystem 105 determine whether a block of data in a memory reference is in the cache ("hit") or not ("miss"). The tags 105b also include one or more tag control bits that indicate relevant information about the associated cache block 105a. For example, the tag control bits may include a valid bit, a shared bit, a dirty bit and a modified bit. The valid bit indicates whether the associated cache block is valid or invalid. In this context valid means the block is available for access by the system, where as invalid means that the system should not use the cache block. A block may become invalid if another processor in the system, for example, was given the block exclusive and modified the block. In this case, the cache copy is "old" and should not be used because a more up-to-date copy exists elsewhere in the system. The shared bit indicates that another processor in the system may have a duplicate copy of the cache block and both processors are sharing the block. The dirty bit indicates that the cache block is different from the copy maintained in memory 102. A block may become dirty, for example, when the block is written, but the updated copy of the data has not yet been written back to memory. The modified bit indicates that an L1 cache contains a more recent copy of the block than what may be contained in an L2 cache (and L1 cache is a smaller, faster storage unit than the L2 cache).

Each cache block has an associated cache state which informs the system as to the state of the block. The tag control bits defined above encode the cache states. In accordance with the preferred embodiment of the invention, the cache states listed in Table 3 below are supported by each processor in the system.

TABLE 3

CACHE STATES

| STATE | DEFINITION |
| --- | --- |
| Invalid | Block is not available for access in the processor's cache. |
| Exclusive-Clean | This processor has an exclusive copy, the value is the same as memory. |
| Exclusive-Dirty | This processor has an exclusive copy, the value may be different than memory. |
| Shared | This processor has a read-only copy, the value is the same as memory. |

The invalid state means that the block is not available for access in the processor's cache because, for example, another processor in the system may have modified the cache block thereby rendering the cache's copy invalid for subsequent use. The exclusive-clean state means that the processor has the block exclusive and that the cache block is identical to what is stored in memory 102. The exclusive-dirty state is similar to the exclusive-clean state except that the cache block is different from the data that is stored in memory 102. This state may occur when the cache block is modified, and the modified data has not yet been written back to memory 102. The shared state means that the processor may have a copy of the block as well as at least one other processor in the system. None of the shared copies can be written while the block is in the shared state.

In summary, each block of data has an associated directory entry in that block's home processor. The directory entry provides information that informs the system as to the coherence state of the block. In conventional systems, each time a block is accessed (read or write), the directory entry for that block may be read, updated and written back to memory. Directory reads and writes require time and thus impact the performance of the system. In accordance with the preferred embodiment of the invention, some directory write cycles that might have occurred in convention systems are avoided because the same or similar information can be stored in the cache subsystem 105. This being the case, some directory writes that, if they had been performed, would have updated directory information can be avoided.

The directory writes that can be avoided are those writes that result from local memory references. FIG. 1 will be used to illustrate two examples of this principle. In the first example, a directory write cannot be avoided. In the second example, in accordance with the preferred embodiment of the invention, a directory write is avoided. Both examples refer to the local processor group 115 shown in FIG. 1 which includes local processors 100a–100d. The examples also refer to remote processors 100e and 100f. The examples also refer to a block A of memory (not specifically shown) whose home processor is processor 100a. As such, the directory entry for block A resides in the memory 102 connected to processor 100a.

In the first example, the directory state for block A indicates that the block is in the Shared1 state in which remote processor 100e has a shared copy of block A. In this example, local processor 100b also has a shared copy of the block. Remote processor 100f sends a store request for block A. Remote processor 100f sends the store request to the memory controller for processor 100a which contains and maintains the directory for block A. All of the local processors in local group 115 receive the store request from remote processor 100f. The cache subsystems for local processors 100a–100d look up their tags to determine if the memory reference is a hit or miss in their respective caches. Because processor 100b is a sharer of block A, the cache subsystem for processor 100b detects a hit. The local processors that are not sharers of block A report misses to the memory controller for block A's home processor 100a.

In response to the store request from remote processor 100f, which needs block A, local processor 100b invalidates its copy of block A in its cache subsystem and reports to the memory controller for home processor 100a that it no longer has the block. The memory controller for processor 100a, after reading the directory for block A and determining that the block was shared at remote processor 100e and determining that the local processors have handled their part of the cache coherency scheme sends the requested data to the requestor processor 100f. Processor 100a also sends a message to processor 100e to invalidate its copy of cache block A. Processor 100a's memory controller must rewrite the directory entry for block A to change the directory state from shared to exclusive to reflect that remote processor 100f now has the block exclusive. In the foregoing example, the directory write was necessary because the requestor was a remote processor.

In the next example, the requestor is one of the local processors. In this example, processor 100b is the requestor of block A. Block A's home processor is processor 100a, both of which are members of local group 115. For this example, the starting directory state for block A reflects that block A is in memory and all of the processor's 100a–100f cache subsystem show the block to be invalid. Local processor 100b desires a store to block A. The memory controller for local processor 100a receives the store request from local processor 100b and, in response, provides the requested block to processor 100b. In accordance with the preferred embodiment of the invention, processor 100a's memory controller does not write the directory entry for block A to a new state to reflect what has transpired. The cache subsystem for requestor, local processor 100b makes or changes the tag control information pertaining to block A to the exclusive-dirty state (Table 3) to reflect that processor 100b's cache has block A exclusive and the data may differ from the copy of block A that is home processor 100'a memory 102.

Later, a read request for block A may be sent from remote processor 100e to the memory controller for home processor 100a. The cache subsystems in each of the processors 100a–100d in the local group 115 also receive or intercept the read request for block A. The cache subsystems for processors 100a, 100c and 100d inform the memory controller for processor 100a that they do not have the requested block (misses). The cache subsystem for processor 100b detects a cache hit and, upon reading the tag control bits, determines that it has the block exclusive. The cache subsystem for processor 100b then sends the requested data to processor 100e and changes its cache state for block A to invalidate its copy of the block. Processor 100b also informs the memory controller for processor 100a what has transpired.

The memory controller for processor 100a, seeing that processor 100b's cache handled the read request, knows to ignore the directory entry for block A, which the memory controller may have read, and instead updates the directory for block A to reflect that processor 100e now has the block exclusive.

It should be noted that in this latter example, the directory entry for block A was not updated via a write upon providing the block to the initial requestor, local processor 100b. Because processor 100b's cache subsystem provides the correct information that processor 100b has the block exclusive in its cache, the directory entry for block A did not have to be updated with the same or similar information. It was not until remote processor 100e submitted its read request for block A that block A's directory was written with new information. This occurred because processor 100e is not part of the local group 115.

In summary, any time when the requestor for a block of data and that block's home processor are both members of the same local group, the home processor need not write the directory to change the directory state. The requestor, instead, tracks the same or similar information via its cache state information associated with the block.

It should become apparent that in those cases in which a local processor has the requested data exclusive and sends the data to the requester directly, there is a significant latency improvement because of the relatively high bandwidth, low latency nature of processor cache subsystems and the avoidance of directory writes to memory. Further, the standard "3-hop" forwarding sequence such as was exemplified in the first example above becomes a 2-hop sequence. Because many of the references in a computer system of this type preferably are optimized to be from local processors, a large number of directory writes can be avoided, and a large amount of exclusive data can be transferred with reduced latency. The preferred embodiment described herein has leveraged a resource (i.e., the cache subsystem) which already exists for entirely different reasons to remove the need for creating additional hardware to improve performance.

The above discussion is meant to be illustrative of the principles and various embodiments of the present invention. Numerous variations and modifications will become apparent to those skilled in the art once the above disclosure is fully appreciated. For example, the number of local processors can be raised, as well as the precise coherence protocol used and the interconnect scheme used to couple the processors together. It is intended that the following claims be interpreted to embrace all such variations and modifications.

What is claimed is:

1. A multi-processor computer system, comprising:

a first group of processors coupled together;

a second group of processors coupled together and coupled to said first group of processors;

one or more input/output devices coupled to at least one of said processors in said first or second group;

wherein each processor in said first and second groups has a cache subsystem and an associated main memory;

each of said processors in said first and second groups maintaining a multi-entry, read/writeable directory in its associated main memory wherein each entry specifies a coherence state of a data block in the main memory;

wherein a memory write reference between processors in said first group does not initiate a directory write of the block associated with the memory write reference, but a memory write reference between a processor in said second group and a processor in said first group causes a directory read and a cache hit/miss determination to occur and initiates a directory write of the block associated with the memory write reference.

2. The computer system of claim 1 wherein each cache subsystem comprises a data portion in which a plurality of blocks of data can be stored and a tag and control portion associated with each block of data stored in the data portion, and wherein the directory entry for each block of data specifies whether the block Is shared or exclusively owned by a processor and wherein the tag and control portion associated with a block of data stored in cache also determines whether the block is shared or exclusively owned by a processor.

3. The computer system of claim 1 wherein each of the processors within the first group are fabricated on a single semiconductor substrate.

4. The computer system of claim 1 wherein a memory write reference provided to one of the processors in the first group is also provided to the other processors in said first group and wherein all of said processors in said first group determine whether the memory write reference is a hit or miss to the cache subsystem in each processor.

5. The computer system of claim 1 wherein a memory write reference provided to one of the processors in said first group from another processor in said first group is also provided to all other processors in said first group, and wherein all of said processors in said first group determine whether the memory write reference is a hit or miss to the cache subsystem in each processor.

6. The computer system of claim 5 wherein the processor in said first group that maintains the directory entry for a requested data block provides the requested data to the processor that sent the memory reference and does write to the directory entry.

7. The computer system of claim 6 wherein after the requested data block is provided to the processor that sent the memory reference, said processor that maintains the directory entry for the data block ignores the directory entry for that data block if another processor in the system initiates a new memory write reference for that same data block.

8. A method to reduce latency in a computer system that includes at least one group of local processors and also includes remote processors and at least one processor includes a directory in which state information is stored, comprising:

initiating a first memory write for requested data;

if said memory write is from a remote processor, reading the directory;

if said memory write is from a local processor, not updating the directory; and providing the requested data to the processor that initiated the first memory request.

9. The method of claim 8 further including updating a cache to reflect that the processor that initiated the first memory write has stored the write data in said cache.

10. The method of claim 9 wherein said processor that initiated the first memory write and the processor that maintains the directory entry for the write data are part of said group of local processors.

11. The method of claim 9 wherein if the director is not updated, ignoring the directory entry upon receiving a second memory write for the same data.

12. A multi-processor computer system, comprising:
a local group of processors coupled together;
a remote group of processors coupled together and coupled to said local group of processors;
wherein each processor in said local and remote groups has a cache subsystem and an associated main memory, and each of the processors in said local group couples to a memory controller that interfaces the local group processors to a main memory;
each of said processors In said local group maintains a multi-entry, read/writeable directory in said main memory wherein each entry specifies a coherence state of a data block In the main memory; and
wherein a memory write between processors in said local group does not initiate a directory write of the block associated with the memory write, but a memory write between a processor in said remote group and a processor in said local group causes a directory read and a cache hit/miss determination to occur and initiates a directory write of the block associated with the memory write.

13. The computer system of claim 12 wherein each cache subsystem comprises a data portion in which a plurality of blocks of data can be stored and a tag and control portion associated with each block of data stored in the data portion, and wherein the directory entry for each block of data specifies whether the block Is shared or exclusively owned by a processor and wherein the tag and control portion associated with a block of data stored in cache also determines whether the block is shared or exclusively owned by a processor.

14. The computer system of claim 12 wherein each of the processors within the local group are fabricated on a single semiconductor substrate.

15. The computer system of claim 12 wherein a memory write provided to one of the processors in the local group is also provided to the other processors in said local group and wherein all of said processors in said local group determine whether the memory write is a hit or miss to the cache subsystem in each processor.

16. The computer system of claim 12 wherein a memory reference provided to one of the processors In said local group from another processor in said local group is also provided to all other processors in said local group, and wherein all of said processors In said local group determine whether the memory write is a hit or miss to the cache subsystem in each processor.

17. The computer system of claim 16 wherein the processor in said local group that maintains a directory entry for the requested data block provides the requested data block to the processor that sent the memory write and writes to the directory entry.

18. The computer system of claim 17 wherein after the requested data block is provided to the processor that sent the memory write, said processor that maintains the directory entry for the data block ignores the directory entry for that data block if another processor in the system initiates a new memory write to that same data block.

* * * * *